United States Patent [19]

Caines

[11] Patent Number: 4,631,155

[45] Date of Patent: Dec. 23, 1986

[54] PROCESS FOR MANUFACTURE OF SURFACE-MODIFIED ORIENTED POLYMERIC FILM

[75] Inventor: R. Scott Caines, Taylors, S.C.

[73] Assignee: American Hoechst Corporation, Somerville, N.J.

[21] Appl. No.: 697,313

[22] Filed: Feb. 1, 1985

[51] Int. Cl.⁴ ............................................ B29C 17/02
[52] U.S. Cl. .................................... 264/22; 156/272.2
[58] Field of Search ...................... 427/53.1, 54.1, 171; 264/22; 156/272.2, 273.3, 275.1

[56] References Cited

U.S. PATENT DOCUMENTS

| | | | |
|---|---|---|---|
| 2,876,187 | 3/1959 | Wolinski | 204/158 |
| 3,145,242 | 8/1964 | Bryan | 264/80 |
| 3,262,808 | 7/1966 | Crooks et al. | 427/171 X |
| 3,669,716 | 6/1972 | Keyl et al. | 427/54.1 |
| 3,674,531 | 7/1972 | Shephard et al. | 427/171 X |
| 3,740,287 | 6/1973 | Eichhorn | 156/272 |
| 3,880,966 | 4/1975 | Zimmerman et al. | 264/25 |
| 3,900,538 | 8/1975 | Kawakami et al. | 264/22 |
| 3,930,064 | 12/1975 | Sander | 427/54.1 |
| 3,943,046 | 3/1976 | De Sorga et al. | 204/159.23 |
| 3,988,157 | 10/1976 | Van Paesschen et al. | 427/171 X |
| 4,123,308 | 10/1978 | Nowlin et al. | 156/272 |
| 4,167,669 | 9/1979 | Panico et al. | 250/341 |
| 4,214,035 | 7/1980 | Heberger | 427/171 X |
| 4,247,496 | 1/1981 | Kawakami et al. | 264/22 |
| 4,417,948 | 11/1983 | Mayne-Banton et al. | 427/53.1 X |

FOREIGN PATENT DOCUMENTS 1117354  6/1968  United Kingdom .
1149812  4/1969  United Kingdom .

OTHER PUBLICATIONS

T. Johnson, "Flashblast-The Light that Cleans", Popular Science 82, (Jul. 1982).
"The Removal and Surface Preparation of Polymers by Flashblasting", (Maxwell Laboratories, Inc.).
"Flashblast Systems Preliminary Specifications", (Maxwell Laboratories Inc.).
"Flash Polymerization by Xenon", (Xenon Corporation).
"Surface Cleaning by Flashblasting", (Maxwell Laboratories, Inc.).
M. Veronda, "John Asmus: Space Age Art Restorer", Caltech News, (Jun. 1982).
J. Brannon, "Surface Preparation by Flashblasting", (Maxwell Laboratories, Inc.).

*Primary Examiner*—Thurman K. Page
*Attorney, Agent, or Firm*—James C. Lydon

[57] ABSTRACT

A process for surface modification of oriented polymeric film is disclosed. The process, applicable to polyesters, polyolefins, and polyamides, involves subjecting the film surface to at least one short pulse of intense electromagnetic radiation. Such surface treatment enhances the heat seal adhesion of the oriented polymeric film.

11 Claims, No Drawings

PROCESS FOR MANUFACTURE OF SURFACE-MODIFIED ORIENTED POLYMERIC FILM

BACKGROUND OF THE INVENTION

The present invention relates to modification of a film surface to enhance the adhesive characteristics of the film. More particularly, the present invention relates to a process for surface modification of oriented polymeric film by application of a short pulse of intense, broad spectrum electro-magnetic radiation thereto.

Biaxially oriented polyethylene terephthalate film is generally considered impossible to heat seal because the high temperature required to melt the film (256° C.) will also damage it. Numerous adhesive coatings have been applied to polyester film in order to improve its heat sealability and a number of these coated films are commercially available.

An example of heat-seal-coated polyethylene terephthalate film is disclosed in D. Hedge, "Heat Seal Coated Polyester Films" British patent specification No. 1,078,813 (Aug. 9, 1967). The Hedge '813 patent discloses a process for the production of a heat seal coated, biaxially oriented polyethylene terephthalate film comprising the steps of melt extruding a substantially amorphous polyester film, drawing the film in the longitudinal direction, thereafter applying a heat seal coating to one or both sides of said film and then drawing the coated film in the transverse direction (page 1, lines 36 to 44). The heat seal coating may be applied as a melt, as a solution in an organic solvent, or as an aqueous dispersion. Polymers which may be conveniently applied to the film in the molten state as a heat seal coating include polyethylene and polypropylene. Polymeric coatings which may be applied as solution or as aqueous dispersions include vinylidine chloride polymer and copolymers of vinylidine chloride with one or more of acrylonitrile, itaconic acid or methacrylic acid, polyvinyl acetate, partially hydrolyzed polyvinyl acetate, co-polymers of vinyl chloride and vinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and another dicarboxylic acid with a glycol, e.g. those containing not more than 4.0 molecular proportions of combined terephthalic acid to one molecular proportion of combined sebacic acid; copolymers of vinylidene chloride and vinylchloride or alkyl acrylates, copolymers of vinyl acetate with vinyl chloride, copolymers of vinyl acetate with ethylene and copolymers of vinyl chloride with ethylene. Heat seal coatings make it more difficult to recycle polyethylene terephthalate (PET) film because the coating contaminates the polymer. In addition, the thermoplastic coating may preclude the use of the coated polyester film in food packaging applications under the applicable Food and Drug Administration regulations, 21 C.F.R. 177.1630 et seq.

The prior art has also employed terephthalate comonomers such as isophthalic acid to produce copolyesters which are more amenable to heat sealing than polyethylene terephthalate homopolyester. The copolyester may comprise the polyester film itself, or a second copolyester film may be laminated onto a first polyethylene terephthalate homopolyester film. An example of a copolyester/polyester laminate is disclosed in P. Stainer et al, "Polyester Film Composites," European patent application No. 81300643.4 (published Sept. 16, 1981). The Stainer application discloses a polyester film composite comprising an oriented layer of a first linear polyester and a heat sealable secondary layer, adherent to the primary layer, comprising an essentially amorphous second linear polyester, said secondary layer containing from .005 to 10% by weight, based upon the weight of the second linear polyester, of a finely-divided particulate additive having an average particle size greater than the thickness of the secondary layer dispersed substantially uniformly throughout the secondary layer, the exposed surface of the secondary layer having anti-blocking surface protrusions produced by the particulate additive, said surface protrusions being present in an area concentration of at least 50 protrusion peaks per square millimeter of surface and having a peak height of at least 0.5 micrometers measured from the surface of the polymer. Polyethylene terephthalate primary layers are particularly preferred. The second linear polyester of the second layer is preferably a copolyester derived from one or more of terephthalic acid, isophthalic acid and hexahydroterephthalic acid and one or more glycols, preferably ethylene glycol. The secondary layers may be disposed on one or both sides of the primary layer. The film composites may have a total thickness in the range of 10 to 500 micrometers and the secondary layers preferably have a thickness of up to 10 micrometers. The particulate-containing polyester composites disclosed in the '835 application were compared to non-particulate containing comparative examples which comprised polyethylene terephthalate as the first linear polyester in the primary layer and a secondary layer comprising a copolyester of 82 mole percent ethylene terephthalate and 18 mole percent ethylene isophthalate.

Unfortunately, there are processing drawbacks associated with the use of copolyester films, especially in reclamation of scrap polyester film.

A third solution proposed by the prior art involves surface modification of biaxially oriented polyethylene terephthalate film by flame, electric corona, or ultraviolet radiation treatment. For example, J. Cristie et al, "Oriented Heat Sealable Polyethylene Terephthalate Plastic Films," British patent specification No. 1,117,354 (June 19, 1968) discloses oriented and heat set polyethylene terephthalate films possessing a surface layer of amorphous disoriented polymer. Such film may be produced by a process in which a drawn and heat set polyethylene terephthalate film is caused to pass or travel over a cooled or rotating roller so that one surface of the film is maintained in contact with said roller and a localized area of the opposite surface of the film is simultaneously subjected to a flame of intense heat, the rate of travel of the film being such that the period of residence of every point in the heated area of the film is sufficient to melt the surface of the film at that point but insufficient to distort the film. Biaxially oriented films which have been surface modified in this manner do not suffer substantial loss of tensile strength. The '354 reference discloses that films produced by this process may be sealed to one another by pressing them together at a temperature between 80° C. and the melting point of the polyethylene terephthalate, preferably at a temperature not higher than a temperature of 30° C. below the melting point of the polyethylene terephthalate, and below the temperature at which the film has been heat set. The higher the temperature for heat sealing the more quickly can it be accomplished. The preferred temperature for heat sealing is between 120° and 180° C. Such polyethylene terephthalate films may be heat-sealed together at their edges to form articles such as bags. The Christie reference states that the amorphous surface of the biaxially oriented polyester enhances the film's resistance to tear and crack propagation.

The Cristie flame process requires close control over process parameters such as burner position, film speed, flame temperature and flame height. Even with such control, it is believed that such surface-modified biaxially oriented polyester film may suffer from non-uniformity in the surface modification. For example, if the flame becomes momentarily more intense the entire polyester film, rather than just the surface, might lose its orientation, melt, or even begin to burn. Conversely, if the flame momentarily becomes less intense the film surface may be unaffected by the process entirely. Certain other difficulties typically encountered with flame treatment of polymeric film are discussed in W. Bryan, "Flame Treatment Of Polymeric Film And Apparatus," U.S. Pat. No. 3,145,242 (Aug. 18, 1964).

"Subbing Process For Photographic Films," British patent specification No. 1,149,812 (Published Apr. 23, 1969) discloses UV irradiation of biaxially oriented, polyester film to enhance the adhesion of the film to photographic emulsion coatings. The '812 patent requires the application of a solution of gelatin or hydrophilic resin in a mixed organic solvent containing 1-25 percent by weight of a swelling agent. The wavelength of the ultraviolet radiation may range from 1800 to 3200 angstroms, and the irradiation preferably takes place either during or after the biaxial orientation process at a temperature ranging from 150° to 250° C.

SUMMARY OF THE INVENTION

The present invention relates to a process for surface modification of thermoplastic, oriented polymeric film comprising subjecting at least one surface of an oriented, thermoplastic polymeric film to a short pulse of electromagnetic radiation possessing sufficient intensity to enhance the heat seal adhesion of said film without substantially decreasing the tensile strength of said film.

DETAILED DESCRIPTION OF THE INVENTION

The Applicant has discovered that conventionally-manufactured, biaxially-oriented polymeric film may be modified to enhance its heat seal adhesion. More particularly, the surface of biaxially-oriented film may be briefly subjected to intense light to impart heat-sealability to the biaxially-oriented film.

The present invention is believed applicable to most oriented polymeric films, including polyolefins, such as polyethylene and polypropylene, polyamides such as nylon, and polyesters, such as polyethylene terephthalate. As a class, polyesters are preferred. The remainder of the specification illustrates the present invention in the context of polyester film.

The chemical composition of the polyester film to be surface-modified is not believed critical to the present invention. Biaxially oriented polyethylene terephthalate is preferred. Other polyesters may include polybutylene terephthalate, polyethylene isophthalate, and copolyesters such as polyethylene terephthalate/polyethylene isophthalate.

The extrusion, orientation, and crystallization steps involved in the manufacture of polymeric film are well known to those of ordinary skill in the art. Polymeric resin is typically melted and extruded through a slit die to form an amorphous sheet onto a polished, revolving casting drum to form a cast sheet of the polymer. Thereafter, the sheet is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts. In the case of polyethylene terephthalate film the stretching temperatures are typically in the range of from 80°–100° C.

The polymeric film is heat treated under dimensional restraint, after stretching, for a period of time necessary to crystallize, or "heat set," the film. Crystallization imparts stability and good tensile properties to the film. When polyethylene terephthalate is heat treated, it is subjected to a temperature in the range of between about 190° C. and 240° C. and, more preferably, in the range of from about 215° C. and 235° C.

The surface of the biaxially oriented polyester film is modified by subjecting it to at least one intense pulse or flash of light. Without intending to be bound by any particular theory, it is believed the intense light flash causes disorientation of the polyester molecules at the film surface. Whatever the actual structural or physicochemical change in the film surface created by the light flash, it has been found to enhance the heat sealability of biaxially-oriented polyester film. It is believed that the tensile strength of biaxially-oriented film is not substantially decreased by the present invention.

The present invention relates to the total amount of radiant energy E falling on a unit area of the film surface in unit time. The time unit should be as short as possible to minimize disorientation of the underlying film.

It is believed that various types of high intensity, short duration irradiation systems may be employed in the instant process. For example, flash photolysis and flash polymerization systems may have utility in the present invention. In practice, the inventor has employed Xenon gas-filled, linear quartz tubes as the light source. These Xenon gas-filled tubes emit a broad spectrum of radiation having wavelengths ranging from the infrared to the ultraviolet. The tubes are air cooled and are located within an aluminum reflector. The tubes have metal electrodes at each end, which are connected by appropriate circuitry, to a power supply and high energy capacitors. The Xenon "lamp" is "flashed" when the capacitor is discharged. Several models of Xenon flash lamp apparatus are commercially available from Maxwell Laboratories, 8835 Balboa Avenue, San Diego, California 92123.

During the inital investigation of the present invention too much radiant energy was deposited upon the film surface, leading to formation of soot on the film surface. It is believed the soot is the result of flash combustion. It was noted that thin polyester films tended to "burn" and/or wrinkle more easily than thick films if too much radiant energy is employed.

While surface modification of the entire film surface is part of the present invention, the preferred embodiment comprises irradiation of only a portion of the film surface thereby producing selected strips or areas of enhanced heat sealability. Such surface modified oriented films are believed to be useful for many packaging applications.

WORKING EXAMPLES

The practice and advantages of the present invention are further disclosed in the following Examples, which are intended to be illustrative only and in no way limit the scope of the claimed invention.

The "Chloroform Test" as discussed below provides a qualitative, visual indication of the biaxial orientation, or lack thereof, at the surface of a polyester film. The test consists of placing a drop of chloroform on the film surface. If the film possesses significant biaxial orientation the chloroform will not penetrate the film surface and the film will remain clear. If the film does not possess significant biaxial orientation, the chloroform will penetrate the surface of the polyester film, turning the affected area opaque via solvent crystallization.

Heat seal adhesion was qualitatively measured by folding two portions of the same film sample together, heat sealing the portions together, and attempting to pull the heat seal apart by hand. With thin films, such as 48 and 57 gauge polyester film, the relatively low film strength of the film samples precludes precise measurement. If a thin film sample tears before the heat seal separates, the heat seal is considered "good," whereas if the heat seal separates prior to the tearing of the film, then the heat seal is considered "poor." Relatively thick films, such as 300 gauge polyester film, possess greater film strength, thereby permitting more precise evaluation of the degree of adhesion of the heat seal.

EXAMPLE I

Eleven samples of 57 gauge (0.00057 inch thick), biaxially oriented, polyethylene terephthalate HOSTAPHAN ® 4000 polyester film were surface modified by a commercially available Maxwell Laboratories Model FB-300 flash lamp system employing two 5-inch Xenon gas lamps. The specifications of the Model FB-300 system are set out below:

TABLE I

| | |
|---|---|
| Density of radiation at the surface of flashlamp head | 3 joules/cm$^2$ |
| Area illuminated by a head, measured at the surface of the head | 2" × 12" |
| Number of heads | 2 |
| Total radiant energy emitted per pulse | 900 joules |
| Pulse duration | 1 millisecond |
| Maximum pulse repetition rate | 1 pulse/second |

The eleven samples were surface-modified on one side only and then tested for surface orientation on both sides by the "Chloroform test," discussed generally above. For testing the polyester samples a drop of chloroform was applied to the non-irradiated portion of each sample and then allowed to run over the irradiated area. Each sample was similarly checked for amorphous surfaces on the non-irradiated, or "backside," of the film.

The irradiated polyethylene terephthalate film samples were tested for heat seal adhesion in the irradiated area only, using a laboratory gradient-type heat sealer, Sentinel Model 24ASG, manufactured by Packaging Industries, P.O. Box 457, Hyannis, Mass. 02601. The heat sealer was initially adjusted to 400° F., six second dwell time, and 40 psi pressure. The heat seal temperature and dwell time was gradually decreased down to 250° F. and one second, respectively. Heat seal adhesion was tested by folding each irradiated sample upon itself, heat sealing one portion of the irradiated surface to another portion, and attempting to pull apart the resulting heat seal by hand. Test conditions and results are reported in Table II below:

TABLE II

| Sample | Distance | Radiant Energy | Chloroform Test | Heat Seal Adhesion |
|---|---|---|---|---|
| 57-1 | 3 cm | 11 J/cm$^2$ | clear | Good (400° F., 6 sec 40 psi) |
| backside | | | clear | |
| 57-2 | 3 cm | 14 J/cm$^2$ | opaque | Good (same conditions) |
| backside | | | clear | |
| 57-3 | 5 cm | 9 J/cm$^2$ | opaque | Good (same conditions) |
| backside | | | clear | |
| 57-4 | 5 cm | 8.5 J/cm$^2$ | opaque | Good (same conditions) |
| backside | | | clear | |
| 57-5 | 5 cm | 8 J/cm$^2$ | almost clear | Good (same conditions) |
| backside | | | clear | |
| 57-6 | 5 cm | 8 J/cm$^2$ | almost clear | Good (same conditions) |
| backside | | | clear | |
| 57-7 | 5 cm | 8.5 J/cm$^2$ | opaque | Good (300° F., 6 sec, 40 psi) |
| backside | | | clear | |
| 57-8 | 5 cm | 8.5 J/cm$^2$ | opaque | Good (300° F., 3 sec, 40 psi) |
| backside | | | clear | |
| 57-9 | 5 cm | 8.5 J/cm$^2$ | opaque | Good (same conditions) |
| backside | | | clear | |
| 57-10 | 5 cm | 8.5 J/cm$^2$ | opaque | Good (300° F., 2 sec, 40 psi) |
| backside | | | clear | |
| 57-11 | 5 cm | 8.5 J/cm$^2$ | opaque | Good (300° F., 1 sec, 40 psi) |
| backside | | | clear | |

EXAMPLE II

Twelve samples of 48 gauge, biaxially oriented, polyethylene terephthalate HOSTAPHAN ® 2000* polyester film were irradiated and tested for amorphous surface and heat seal adhesion using the equipment and general procedures disclosed in Example I. Test conditions and results are reported in Table III below:

*HOSTAPHAN ® is a registered trademark of Hoechst AG. HOSTAPHAN ® 2000 polyethylene terephthalate film contains clay and calcium carbonate which enhance the slip properties of the polyester film. HOSTAPHAN ® 4000 does not contain either clay or calcium carbonate. Both polyester film products are commercially available from American Hoechst Corporation, Route 202–206 North, Somerville, N.J. 08876.

EXAMPLE III

Sixteen samples of 300 gauge (0.003 inch thick), biaxially oriented, polyethylene terephthalate HOSTAPHAN ® 2000 polyester film were irradiated and then tested for amorphous surface and heat seal adhesion using the equipment and general procedures disclosed in Example I. Test conditions and results are reported in TABLE IV below:

TABLE IV

| Sample | Distance | Radiant Energy | Chloroform Test | Heat Seal Adhesion |
|---|---|---|---|---|
| 300-1 | 5 cm | 7.0 J/cm$^2$ | clear | None (250° F., 1 sec, 40 psi) |
| backside | | | clear | |
| 300-2 | 5 cm | 9.0 J/cm$^2$ | clear | None (same conditions) |
| backside | | | clear | |
| 300-3 | 4 cm | 9.0 J/cm$^2$ | clear | None (same conditions) |
| backside | | | clear | |
| 300-4 | 4 cm | 11.5 J/cm$^2$ | opaque | Little (300° F., 1 sec 40 psi) |
| backside | | | clear | |
| 300-5 | 4 cm | 10.0 J/cm$^2$ | clear | None (300° F., 2 sec, 40 psi) |
| backside | | | clear | |
| 300-6 | 3 cm | 11 J/cm$^2$ | opaque | Little (same conditions) |
| backside | | | clear | |
| 300-7 | 3 cm | 12–13 J/cm$^2$ | opaque | Little (same conditions) |
| backside | | | clear | |
| 300-8 | 3 cm | 14 J/cm$^2$ | opaque | Fair (same conditions) |
| backside | | | clear | |
| 300-9 | 3 cm | 12–13 J/cm$^2$ | opaque | Fair (same conditions) |
| backside | | | clear | |
| 300-10 | 3 cm | 12–13 J/cm$^2$ | opaque | Good (same conditions) |
| backside | | | clear | |
| 300-11 | 3 cm | 12–13 J/cm$^2$ | opaque | Good (same conditions) |
| backside | | | clear | |
| 300-12 | 3 cm | 12–13 J/cm$^2$ | opaque | Good (same conditions) |
| backside | | | clear | |
| 300-13 | 3 cm | 12–13 J/cm$^2$ | opaque | Good (same conditions) |
| backside | | | clear | |
| 300-14 | 3 cm | 12–13 J/cm$^2$ | opaque | Good (same conditions) |
| backside | | | clear | |
| 300-15 | 3 cm | 11 J/cm$^2$ | opaque | Fair (same conditions) |
| backside | | | clear | |
| 300-16 | 3 cm | 14 J/cm$^2$ | opaque | Good (same conditions) |
| backside | | | clear | |

EXAMPLE IV

Non-irradiated control samples of 48 gauge and 300 gauge biaxially oriented, polyethylene terephthalate HOSTAPHAN ® 2000 polyester film were evaluated

TABLE III

| Sample | Distance | Radiant Energy | Chloroform Test | Heat Seal Adhesion |
|---|---|---|---|---|
| 48-1 | 5 cm | 9 J/cm$^2$ | opaque | too wrinkled - not |
| backside | | | clear | attempted |
| 48-2 | 5 cm | 7 J/cm$^2$ | clear | no amorphous layer - not |
| backside | | | clear | attempted |
| 48-3 | 5 cm | 8 J/cm$^2$ | opaque | Good (250° F., 1 sec, 40 psi) |
| backside | | | clear | |
| 48-4 | 5 cm | 7.5 J/cm$^2$ | opaque | Poor (same conditions) |
| backside | | | clear | |
| 48-5 | 5 cm | 7.5 J/cm$^2$ | opaque | Good (same conditions) |
| backside | | | clear | |
| 48-6 | 5 cm | 7.5 J/cm$^2$ | opaque | Good (same conditions) |
| backside | | | clear | |
| 48-7 | 5 cm | 7.5 J/cm$^2$ | opaque | Good (same conditions) |
| backside | | | clear | |
| 48-8 | 5 cm | 7.5 J/cm$^2$ | opaque | Good (same conditions) |
| backside | | | clear | |
| 48-9 | 5 cm | 7.5 J/cm$^2$ | opaque | Good (same conditions) |
| backside | | | clear | |
| 48-10 | 5 cm | 7.5 J/cm$^2$ | opaque | Good (same conditions) |
| backside | | | clear | |
| 48-11 | 5 cm | 7.0 J/cm$^2$ | almost clear | Poor (same conditions) |
| backside | | | clear | |
| 48-12 | 5 cm | 7.0 J/cm$^2$ | opaque | Good (same conditions) |
| backside | | | clear | | for surface amorphism and heat seal adhesion using the equipment and general procedures described in Example I. Test results and conditions are set out in Table V below:

TABLE V

| Sample | Distance | Radiant Energy | Chloroform Test | Heat Seal Adhesion |
|---|---|---|---|---|
| 48-13 backside | NOT IRRADIATED | | clear clear | Poor (250° F., 1 sec, 40 psi) |
| 300-17 backside | NOT IRRADIATED | | clear clear | None (300° F., 2 sec, 40 psi) |

I claim:

1. A process for surface modification of oriented, thermoplastic polymeric film comprising subjecting at least one surface of said polymeric film to a short pulse of electromagnetic radiation possessing sufficient intensity to enhance the heat seal adhesion of said film without substantially decreasing the tensile strength of the film, wherein only selected areas or strips of the film surface are subjected to said short pulse of electromagnetic radiation.

2. The process of claim 1 wherein said polymeric film is selected from the group consisting of polyolefins, polyamides, and polyesters.

3. The process of claim 2 wherein said polymeric film is a polyester.

4. The process of claim 3 wherein said polyester film is polyethylene terephthalate.

5. The process of claim 1 wherein said polymeric film is a polyolefin.

6. The process of claim 5 wherein said polyolefin is polypropylene.

7. The process of claim 5 wherein said polyolefin is polyethylene.

8. The process of claim 1 wherein said polymeric film is a polyamide.

9. The process of claim 1 wherein said short pulse of electromagnetic radiation delivers approximately 7 to 14 joules of radiant energy per square centimeter of selected polymeric film surface.

10. The process of claim 1 wherein said short pulse of radiation comprises infrared, visible, and ultraviolet wavelengths.

11. The process of claim 9 wherein the short pulse of electromagnetic radiation comprises an emission from a Xenon gas filled quartz lamp produced by high energy capacitive discharge which has a duration of approximately 1 millisecond.

* * * * *